United States Patent [19]
Schnurr et al.

[11] Patent Number: 5,747,720
[45] Date of Patent: May 5, 1998

[54] TACTICAL LASER WEAPON SYSTEM FOR HANDLING MUNITIONS

[75] Inventors: Alvin D. Schnurr, Los Angeles; Charles W. Clendening, Jr., Torrance; Josef Shwartz, Beverly Hills; Richard H. Moyer, Rolling Hills Estates, all of Calif.

[73] Assignee: TRW Inc., Redondo Beach, Calif.

[21] Appl. No.: 485,550

[22] Filed: Jun. 1, 1995

[51] Int. Cl.$^6$ ................................................ B64O 1/04
[52] U.S. Cl. ................................................ 89/1.11; 250/347
[58] Field of Search ........................ 89/1.11, 41.06; 250/347, 203.6

[56] References Cited

U.S. PATENT DOCUMENTS

| | | | |
|---|---|---|---|
| 3,731,103 | 5/1973 | O'Meara | 250/199 |
| 3,946,233 | 3/1976 | Erben et al. | 250/347 |
| 3,982,713 | 9/1976 | Martin | 244/3.1 |
| 3,992,628 | 11/1976 | Karney | 250/338 |
| 4,538,907 | 9/1985 | Rocchi | 356/1 |
| 4,673,250 | 6/1987 | Roberts et al. | 350/320 |
| 4,686,605 | 8/1987 | Eastlund | 361/231 |
| 4,765,244 | 8/1988 | Spector et al. | 102/213 |
| 4,922,827 | 5/1990 | Remo | 102/496 |
| 5,013,151 | 5/1991 | Hughes | 356/152 |
| 5,041,834 | 8/1991 | Koert | 342/367 |
| 5,050,476 | 9/1991 | McKnight et al. | 89/1.11 |
| 5,185,815 | 2/1993 | Brandstetter | 382/31 |
| 5,198,607 | 3/1993 | Livingston et al. | 89/1.11 |
| 5,269,288 | 12/1993 | Stirbl et al. | 126/593 |

*Primary Examiner*—J. Woodrow Eldred
*Attorney, Agent, or Firm*—Michael S. Yatsko

[57] ABSTRACT

A laser weapon system and method are provided for detecting and engaging a large number of target munitions with a plurality of independently steered laser beams, and is particularly adapted to defend against multiple biological and chemical warfare munitions. The system includes a laser generator for generating laser energy and a segmented mirror having an array of controllable mirror segments for dividing the laser energy into a plurality of steerable laser beams. The low energy divided laser beams are directed through an amplifier to achieve high energy laser beams which are output in a fanned array within a shield zone. A detector senses the presence of munitions. An illuminator laser continually sweeps the shield zone and a receiver receives reflections from munitions which fall within the shield zone. The relative position of the detected munitions within the shield zone are compared to the position of laser beams and control signals are determined so as to steer the laser beams to engage the detected munitions within the shield zone and attempt to destroy the engaged munitions.

28 Claims, 6 Drawing Sheets

TACTICAL LASER WEAPON SYSTEM FOR HANDLING MUNITIONS

BACKGROUND OF THE INVENTION

1. Field of the Invention

The present invention is generally related to laser-based weaponry systems and, more particularly, to a high energy laser weapon system and method for detecting and engaging a large number of munitions with a plurality of independently controlled laser beams.

2. Description of Related Art

Weapon defense systems have been developed and used for military purposes to defend against airborne warfare objects which pose a threat. Potential airborne threats generally include missiles, rockets, bombs, dispensed munitions and other like warfare objects. In the past, conventional weapon systems have employed a radar-based tracking system for detecting the presence of an incoming threat and a complex tracking apparatus for tracking the threat. Separate fighting equipment is used in an attempt to engage so as to damage or destroy the incoming threat. Conventional fighting equipment has included the use of a boosted kinetic energy projectile such as air-to-air or ground-to-air interceptor missiles. As is typical with various known conventional approaches, the targeting equipment often requires a sophisticated processing technique to predict the appropriate travel path of the targeted projectile to engage the target in hopes of destroying it. This often involves a very complicated and costly system and the system is generally designed to handle one or a few targets during a relatively long warning-to-engagement timeline.

Laser-based systems and system concepts have been developed for tracking and destroying targets with the use of high energy laser beams. Such laser systems have been generally thought of as capable of generating a high power energy beam which is capable of rapidly destroying a single target. However, conventional laser-based weapon systems and system concepts typically require a large amount of energy focused on individual targets for allowing serial engagement of single targets, one at a time. Additionally, conventional laser systems are often limited in their effective destructive range and quite often are designed to track and engage only boosted objects which dissipate substantial infra-red radiation, thereby enabling passive detection with infrared sensors.

More recently, the possible tactical use of biological and chemical warfare has raised serious concerns about the possibility of deploying multiples of tens or hundreds of munitions or submunitions carried on a single warhead for deployment outside the range of most conventional non-boost based defense systems. Accordingly, a potential threat exists whereby one or more incoming missiles can deliver salvos of chemical and biological submunitions or, similarly, salvos of chemical or biological warheads through the use of artillery and multiple launch rocket systems. Submunitions carried on a warhead can potentially be deployed before or after reentry into the earth's atmosphere and would thereby leave a cloud of incoming munitions falling toward the ground. A potential biological or chemical warfare threat could be potentially devastating, especially when deployed in a largely populated urban environment, industrial region or an area with a high concentration of military forces.

While the conventional anti-aircraft and anti-missile defense systems are often capable of engaging and knocking out single threats, most known weapon systems require substantial sophistication, and are unable to handle the deployed multiple biological or chemical munitions scenario. This is because conventional defenses can engage a limited number of simultaneous threats, and have timelines which are generally too long for the multiple repeated engagements that would be necessary with such systems to engage a large number of threats. Additionally, given small munitions size and small infrared signature, kill probabilities for kinetic energy systems would be significantly less than 100% for each submunition. Further, for such large salvos of cheap munitions, the cost-exchange ratios (the ratio of defending expendable cost to attacking expendable cost) are unacceptable with most conventional approaches.

It is therefore desirable to provide for a system and method of defending against a large number of incoming threat munitions, especially those with a potential for carrying biological or chemical warfare agents.

It is also desirable to provide for a laser weapon system that is operable for detecting and engaging a plurality of incoming targets in a relatively short time span.

It is further desirable to provide for a high energy laser weapon system and method of detecting and simultaneously destroying a plurality of incoming munitions with a plurality of steered laser beams that share common laser beam generation components.

Yet, it is also desirable to provide for such a laser weapon system and method which is capable of quickly handling a large number of incoming munitions such as those described above in connection with the chemical and biological warfare scenario.

SUMMARY OF THE INVENTION

In accordance with the teachings of the present invention, a system and method are provided for detecting and engaging a large number of incoming munitions. The system includes a detector for detecting the presence of targeted munitions. An active illuminating laser transmits an illuminating laser beam through a selected shield zone and a sensor array receives reflected signals reflected from targeted munitions located within the shield zone. A laser source generates laser energy which is reflected from a segmented mirror. The segmented mirror has a plurality of controllable segments for controllably directing a plurality of output laser beams along independently steered paths. An amplifier is coupled to the output of the segmented mirror for amplifying the steered laser beams. The laser output beam vectors are compared to the reflected signals and the laser output beams are controllably steered, so as to track and engage the detected targeted munitions within the shield zone. The shield zone is selected so as to contain a group of munitions that can be handled by the laser output beams, and the shield zone can be modified to accommodate various munitions groupings.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

Figure 1:
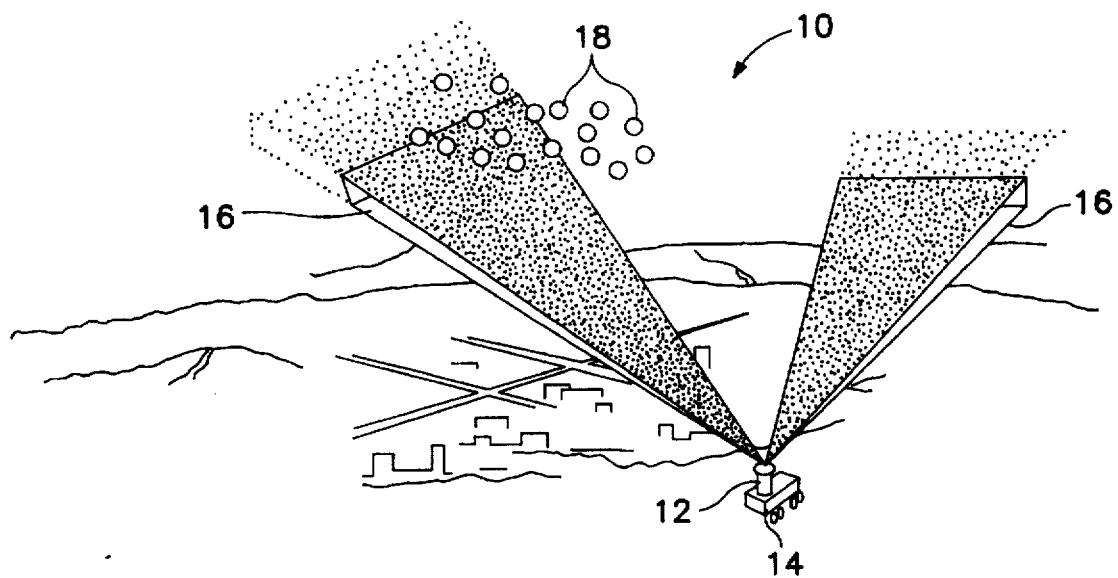
FIG. 1 illustrates one embodiment of a laser weapon system of the present invention deployed from a single ground-based vehicle.

Turning now to FIG. 1, deployment of a laser weapon system 12 is provided according to one embodiment of a salvo handling deployment configuration 10 to protect a geographic area, such as a city, from a plurality of falling munitions 18. The laser weapon system 12 of the present invention may easily be installed on a mobile transport vehicle 14 as shown for realizing ease in transportation and quick response time for use at different locations. While mobile transport vehicles are shown, the system 12 of the present invention could be deployed from fixed locations. Generally speaking, the laser weapon system 12, according to the deployment configuration 10 shown in FIG. 1, generates and focuses a plurality of high energy laser beams within one or more designated shield zones 16. Each shield zone 16 generally extends in a wedge shaped region and can be shifted as required during engagement to cover different regions of a protected area.

Figure 2:
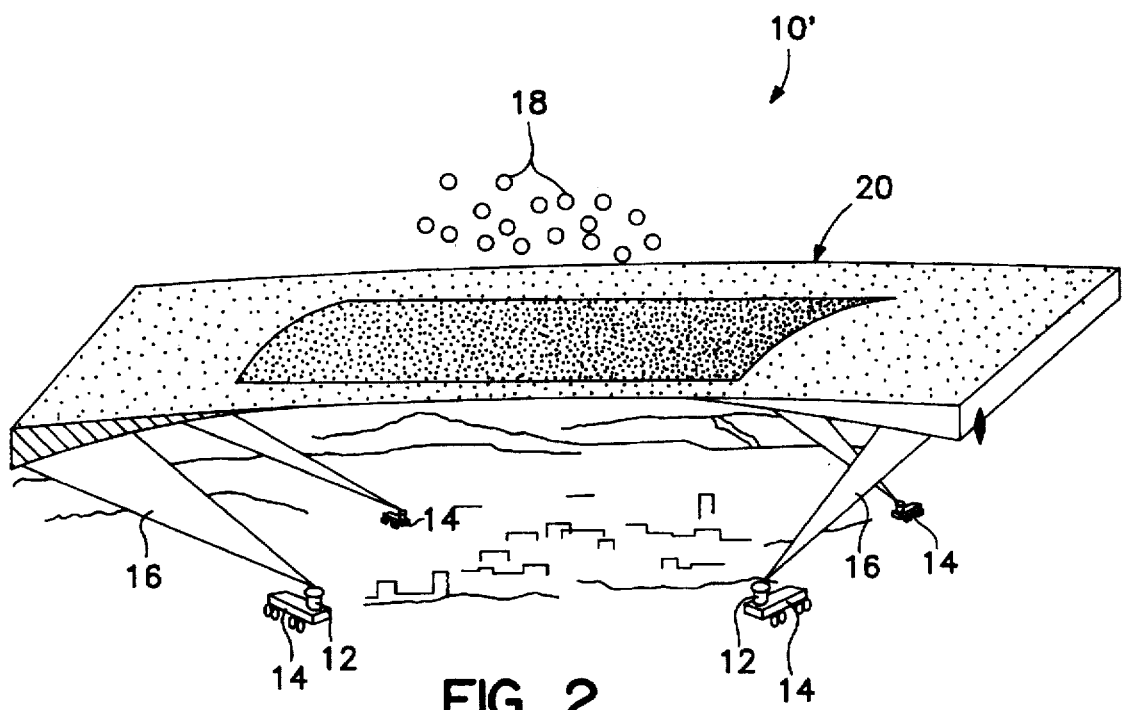
FIG. 2 illustrates another embodiment of the laser weapon system of the present invention deployed from a plurality of ground-based mobile vehicles.

Referring to FIG. 2, a platoon of four laser weapon systems 12 are shown deployed in cooperation with each other to cover an extended shield zone 20 in a deployment configuration 10' according to another embodiment. In both of the configurations 10 and 10' shown respectively in FIG. 1 and FIG. 2, the laser weapon system 12 of the present invention detects, tracks, and attempts to destroy a large number of munitions 18 by engaging each of the munitions 18 with a fan of individually controlled laser energy beams. It should be appreciated that the present invention is particularly desirable for destroying threats of biological or chemical warfare in a scenario where a large number of biological or chemical munitions 18 may be deployed simultaneously from one or more warheads.

Figure 3:
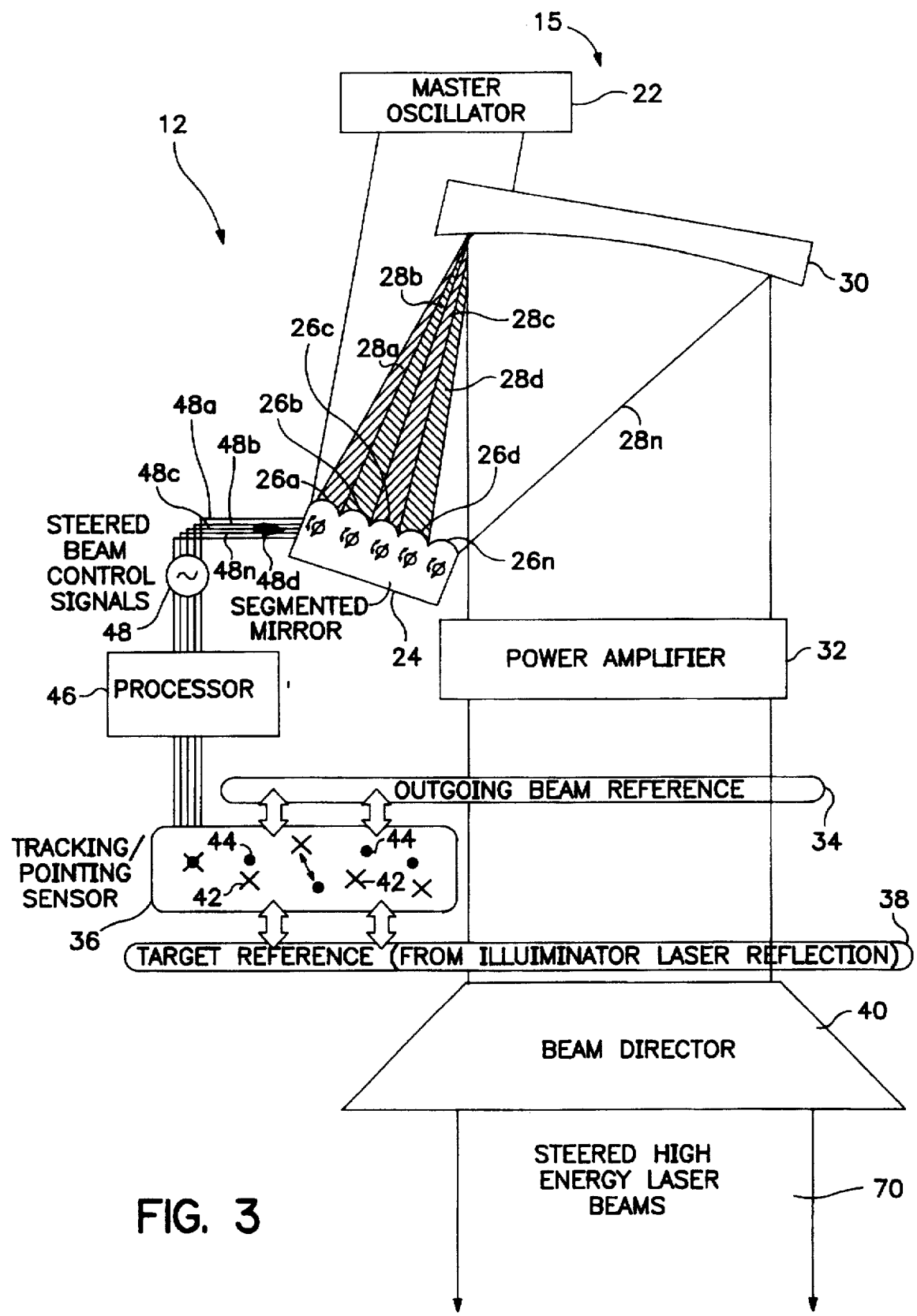
FIG. 3 is a schematic diagram illustrating a laser beam generator for producing multiple independently steered laser beams according to the present invention.
Figure 4:
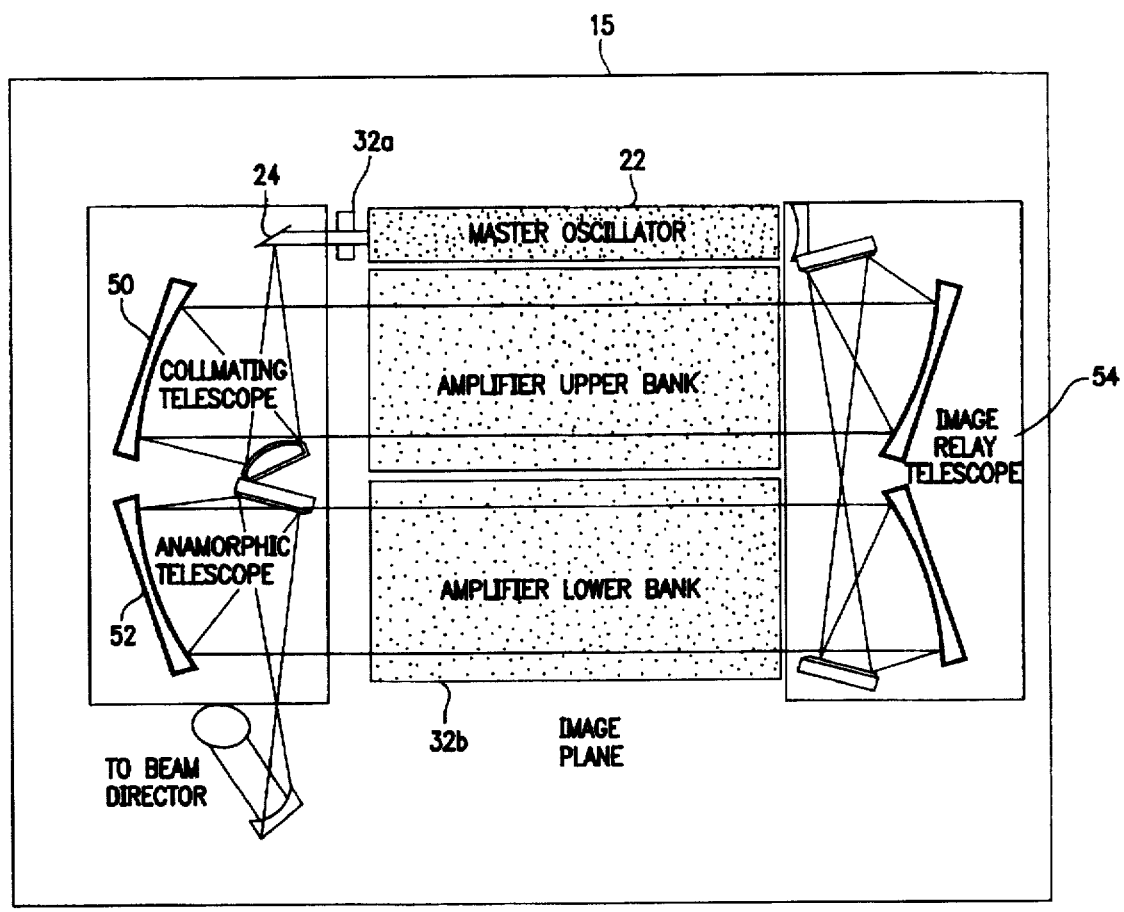
FIG. 4 is an end view of the laser beam generator generally shown in FIG. 3.

The laser weapon system 12 of the present invention generates a plurality of high energy laser beams with a laser beam generator 15 as shown in detail in FIGS. 3 and 4. The laser beam generator 15 has a master oscillator 22 for generating laser energy. Master oscillator 22 outputs a relatively low energy laser beam which is focused onto a segmented mirror 24. The segmented mirror 24 is made up of an array of individually controlled mirror segments 26a through 26n. Each of the mirror segments 26a through 26n is controlled in angle by actuators so that each mirror segment redirects a portion of the low energy laser beam output from master oscillator 22 toward a main reflector 30. Each of mirror segments 26a through 26n of segmented mirror 24 is controllably steered in response to control signals 48a through 48n, respectively.

The laser beam generator 15 also has a power amplifier 32 operatively coupled to main reflector 30. More specifically, the individually steered low energy laser beams or beamlets 28a through 28n are reflected from main reflector 30 and directed through power amplifier 32. Accordingly, the low power laser energy produced by master oscillator 22 is divided into beams and each beam is controllably steered in a desired direction prior to amplification to a high energy level.

With particular reference to FIG. 4, the power amplifier 32 is generally made up of an upper amplifier bank 32a and a lower amplifier bank 32b positioned between telescopes designed to assure proper positioning of the various beamlets in the amplifier. Such telescopes would generally include a colimating telescope 50 and an anamorphic telescope 52 on one side of amplifier 32 and an image relay telescope 54 on the other side. It should be appreciated that the upper bank 32a and lower bank 32b of power amplifier 32 and oscillator 22 are preferably arranged in a stacked relationship and can be made up of a gain generator generally configured as a conventional single pass master oscillator-power amplifier with rectangular banks to generate the desired gain laser outputs.

Referring again to FIG. 3, the laser beam generator 15 further includes a beam director 40 which outputs a plurality of individually steered high energy laser beams 70. In addition, the laser weapon system 12 further includes a tracking/pointing sensor 36. Sensor 36 detects a relative location of each of the individual munitions 18 present within a selected shield zone by sensing illuminator laser beam energy reflected by each munition as will be discussed later hereinafter in connection with FIGS. 5 and 6. The detected munitions are detected as target reference 38 and shown on sensor 36 as provided by target markers 42. In addition, an outgoing beam reference 34 is provided to provide the relative pointing direction for each of the laser output beams 70. The relative laser output beams positions are provided on sensor 36 as shown by beam marker 44.

Tracking/pointing sensor 36 provides an indication of the relative position of each of the detected munitions 18 within a selected shield zone 60 as well as an indication of the current position of each of the laser output beams 70. The tracking/pointing sensor 36 in combination with a built-in processing unit or externally coupled processor 46 determines the angular position of each target 42 as compared to an angular position of a corresponding laser output beam 44. The difference between the laser output beam and the target angle is then used to determine the necessary control drive signals 48a through 48n to drive the appropriate mirror segments 26a through 26n of segmented mirror 24 in order to achieve alignment of the corresponding laser beams 70 with the detected targets.

Figure 5:
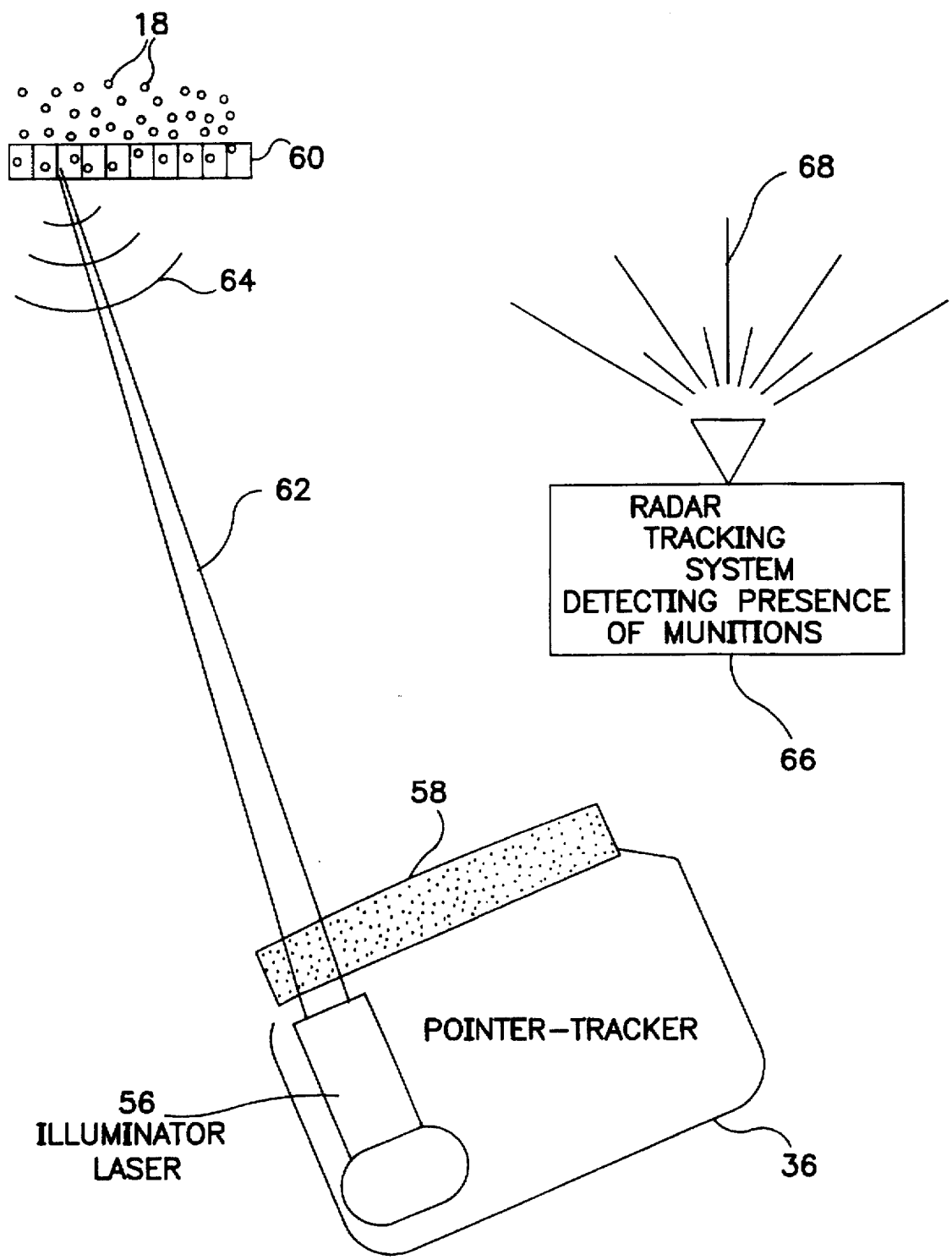
FIG. 5 illustrates a scenario of detecting and tracking a plurality of incoming warfare munitions according to the present invention.

With particular reference to FIG. 5, the tracking/pointing sensor 36 is further shown and includes an illuminator laser 56 for generating an illuminating laser beam 62. The tracking/pointing sensor 36 further includes an illuminator laser beam receiver 58 for receiving reflections of the illuminating laser beam 62 from munitions 18 generally located in a selected shield zone 60. With shield zone 60 defined, the shield zone 60 is continuously scanned via illuminator laser beam 62 as will be discussed in greater detail hereinafter in connection with FIG. 6.

In addition, a radar tracking system 66 is shown for detecting the presence of targeted munitions 18. This may include a conventional radar tracking system for emitting a radar signal 68 throughout a relatively wide field of view and receiving reflections thereof from objects within the field of view. Radar tracking system 66 is employed by laser weapon system 12 to provide an indication that a plurality of munitions 18 are present within a monitored field of view. It is preferred that radar tracking system 66 continually monitors the appropriate airspace to detect the presence of targeted munitions 18 prior to activation of the illuminator laser 56.

Figure 6:
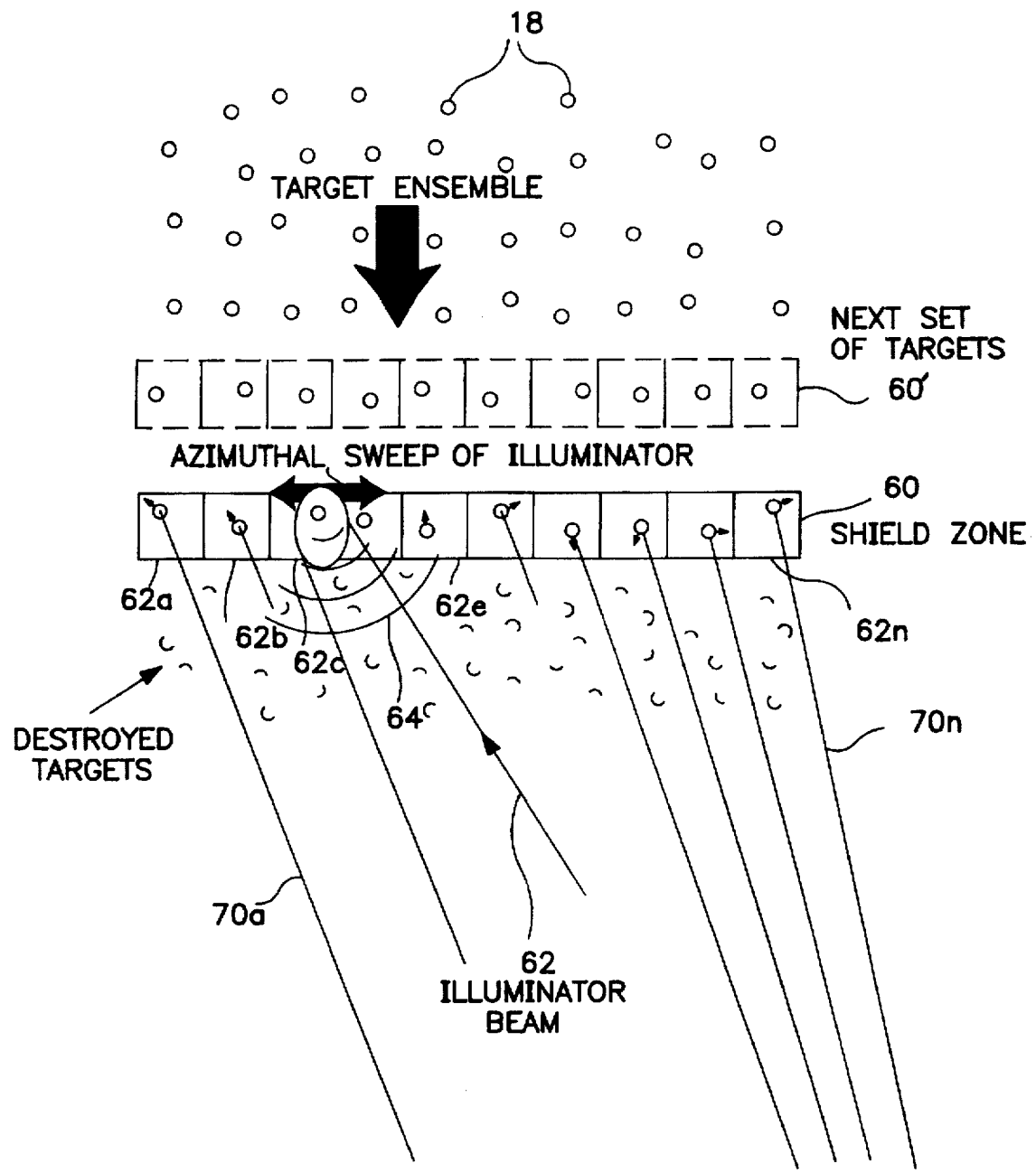
FIG. 6 further illustrates detection and tracking of munitions and engagement with the plurality of steered laser beams according to the present invention.

Referring now to FIG. 6, the overall shield zone 60 is shown generally including an array of shield zone regions 62a through 62n. In a preferred embodiment, each of shield zone regions 62a through 62n is preferably configured to contain zero or one targeted munition 18, however, a plurality of munitions 18 may be handled within each shield zone region 62. Each of laser beams 70a through 70n is preferably dedicated to one of the corresponding shield zone regions 62a through 62n for handling and engaging detected munitions 18 within the corresponding shield zone regions 62a through 62n, respectively.

The shield zone 60 is preferably defined in a region of space covering a protected area and is preferably capable of handling a limited number of targeted munitions 18 at one time. Handling of targeted munitions is simplified by addressing only munitions that fall into the relatively narrow elevation width of the shield zone 60. This provides a straightforward approach to designating appropriate targets and avoids problems caused by falling clutter from previously destroyed target debris.

According to one example, the laser weapon system 12 is configured to generate a fan of ten laser beams 70 which may simultaneously handle up to a like number (i.e., ten) of munitions 18 within the shield zone 60. The shield zone 60 may be set in place to handle the next set of targeted munitions 18 as shown as the deployed munitions 18 fall within the shield zone 60. Each of the ten laser beams are capable of engaging a munitions target 18 within its designated shield zone region 62. However, in the case of target clumping, for smaller target sets, the laser beams 70 could be rearranged or combined within zone regions 62 to increase performance. When more than ten targeted munitions 18 are simultaneously detected within the shield zone 60, the elevational thickness of the shield zone 60 is preferably decreased to keep the number of munitions targets 18 equal to or below the number of laser beams 70, i.e., ten or less for this example.

With the shield zone 60 set in place at the bottom of the detected threat ensemble of targeted munitions 18, each of the laser beams 70 repeatedly sweep in a substantially vertical motion so as to follow and engage the target munitions 18 that fall into the corresponding region 62 of shield zone 60. Engagement of a laser beam 70 with a targeted munition 18 occurs for an adequate kill time which will vary depending on the type and size of munitions 18. For example, with a sub-megawatt-class laser beam generator and a target distance of approximately several kilometers, a kill time of substantially less than a second may generally be sufficient to destroy typical biological munitions, while less than a second may be sufficient to kill typical chemical munitions.

Once a targeted munition 18 is destroyed, the corresponding laser beam 70 will wait for the next targeted munition 18 to fall within the corresponding region 62 of shield zone 60. When all targeted munitions 18 within the shield zone 60 have been engaged and destroyed, the shield zone 60 can return to the bottom of the remaining threat ensemble of targeted munitions 18 as shown by shield zone 60'. With munitions present, the laser beam sweeping engagement is again repeated to kill the next set of targeted munitions 18 that fall into a shield zone 60.

Figure 7:
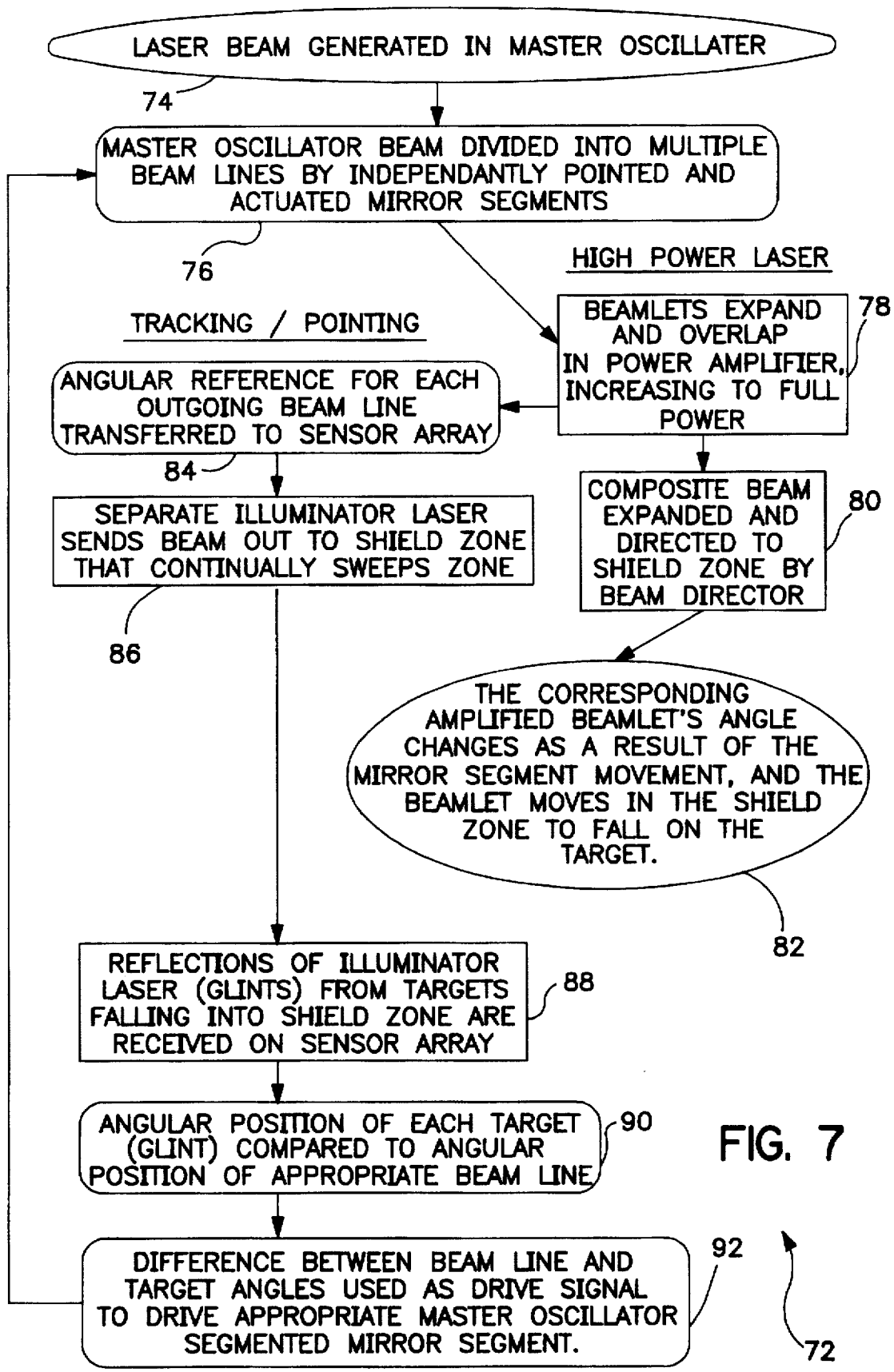
FIG. 7 is a flow diagram illustrating the methodology of detecting and engaging a plurality of munitions with the present invention.

The step-by-step method 72 of detecting and engaging a plurality of targeted munitions 18 with the laser weapon system 12 of the present invention is provided in FIG. 7. The methodology 72 begins at step 74 in which a low energy laser beam is generated in the master oscillator once a plurality of target munitions 18 have been detected with the radar detector system 66. Proceeding to step 76, the low energy laser beam generated in the master oscillator is divided into multiple laser beams 28a through 28n by the independently steered mirror segments 26a through 26n of the segmented mirror 24. The divided laser beams 28a through 28n are reflected off reflector 30, expand and overlap in the power amplifier 32 and thereby increase to a high energy level as provided in step 78. The fan of composite beams 70a through 70n is expanded and directed into the shield zone 60 by beam director 40 as described in step 80.

Referring to step 84 of the methodology 72, an angular reference is determined for each outgoing laser beam 70 and this angular reference is transferred to the sensor array 36. As provided in step 88, the illuminator laser 56 actively emits an illuminating laser beam 62 that is continually swept across the shield zone 60. Reflections 64 of the illuminator laser beam (i.e., glints) from targeted munitions 18 which fall into the shield zone 60 are received by the receiver sensor focal plane array 58 as provided in step 88. Next, in step 90, an angular position of each detected targeted munition is compared to an angular position of a corresponding laser beam covering the same region 62 of shield zone 60. Differences between the laser beam 70 and the detected targeted munitions 18 angles are determined and used to determine the control drive signals 48a through 48n to drive the appropriate segmented mirror segments 26a through 26n as described in step 92.

From step 92, the methodology 72 returns to step 76 whereby the divided laser beams 28a through 28n are steered in response to the respective control drive signals 48a through 48n as previously determined in step 92. Finally, referring to step 82, the high energy laser beam outputs 70a through 70n are independently steered in response to movement of the mirror segments 26a through 26n of segmented mirror 24. Accordingly, the laser beam outputs 70a through 70n are controllably steered within the regions 62 of shield zone 60 to engage and destroy targeted munitions 18 detected therein.

The laser weapon system 12 of the present invention can advantageously be deployed to handle the previously described biological and chemical warfare scenario. For the biological munitions threat, for example, a single laser beam generator with ten independently steered laser beams could defend an area eight to ten kilometers in diameter against an incoming threat ensemble of one thousand biological munitions 18 destroying the munitions in less than a minute. A four unit configuration, such as that shown in FIG. 2, could be deployed at the corners of a square with about a six kilometer separation distance to defend an area of more than twice that size. With such a deployment, the biological munitions ensemble described above could be destroyed in a fraction of a minute. Given a chemical munitions ensemble, destruction would also occur in a fraction of a minute, but would typically require up to twice the time needed for biological munitions, since chemical munitions, while generally fewer in number in a warhead than biological munitions, are generally known to require a longer kill time and are more dense and therefore are able to fall at a faster rate of speed.

While the laser weapon system 12 of the present invention has been described herein in connection for handling the ensemble threat of biological and chemical warfare munitions 18, it should be understood that the laser weapon system 12 is applicable for detecting and engaging a plurality of any type of airborne targets. For example, targeted munitions could include other objects such as rockets and artillery salvos.

Thus, while this invention has been disclosed herein in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A laser weapon system operable for detecting and engaging a plurality of moving objects which may represent potential threats, said system comprising:

means for detecting a presence of a plurality of said moving objects;

means for selecting a shield zone that covers a limited number of said plurality of objects, said shield zone covering only a portion of a potential coverage zone of the system;

means for detecting a relative location of individual objects within said selected shield zone;

laser source means for producing a plurality of high energy laser beams which are operable for simultaneously engaging a group of said plurality of said objects, said plurality of high energy laser beams being deployed from substantially a common location, each of said laser beams being independently controlled within a designated region of said shield zone and said laser beams engaging different ones of said objects within said selected shield zone; and beam control means for independently controlling each of said plurality of laser beams so that individual ones of said laser beams engages and attempts to damage or destroy individual ones of said targets within said shield zone.

2. The system as defined in claim 1 wherein said laser source means comprises:

a laser source for generating laser energy; and a segmented mirror optically coupled to the laser source, said segmented mirror having an array of mirror segments for dividing said laser energy into a plurality of laser beams, each segment being independently controlled so as to control a corresponding laser beam.

3. The system as defined in claim 2 wherein said laser source means further comprises an amplifier optically coupled to the segmented mirror for amplifying each of said laser beams to achieve high energy laser beams.

4. The system as defined in claim 1 wherein said means for detecting a relative location of moving objects within the selected shield zone comprises:

an active illuminator laser for emitting an illuminating laser beam through the shield zone; and a focal plane array of receivers operable for detecting reflection of said illuminator laser beam from said detected objects and providing a relative approximate location thereof.

5. The system as defined in claim 4 further comprising means for determining an angle of approach of said reflective energy and comparing said angle of approach with an angle of departure for one of said laser beams and generating a tracking control signal as a function of the comparison.

6. The system as defined in claim 1 wherein said moving objects comprise a plurality of dispensed munitions.

7. The system as defined in claim 1 wherein said means for detecting the presence of a plurality of objects comprises radar.

8. The system as defined in claim 1 wherein said laser beams are operable to simultaneously engage said moving objects.

9. The system as defined in claim 1 wherein said shield zone is controllably selected to contain groups of incoming objects, one group at a time, wherein location of the shield zone may change to handle said one group at a time.

10. A high energy laser weapon system operable for detecting and engaging a plurality of munitions, comprising:

means for detecting a presence of a plurality of munitions;

means for selecting a shield zone that covers only a portion of a potential coverage zone of the system to handle a limited number of said plurality of munitions at one time;

sensing means for sensing a relative location of individual ones of said munitions within the selected shield zone;

a laser source for generating laser energy;

a segmented mirror having an array of individually controlled segments for controllably directing portions of said laser energy into separate independently controlled low energy laser beams;

an amplifier for amplifying said low energy laser beams and outputting a plurality of independently controlled high energy laser beams; and means for controlling each of said array of segments of said segmented mirror in response to the sensed locations of said munitions within the shield zone so as to direct the high energy laser beams to engage different ones of the detected munitions in the shield zone.

11. The system as defined in claim 10 wherein said sensing means comprises:

an illuminating laser for generating an illuminating laser beam through the shield zone; and a focal plane array of sensing elements for receiving reflections of said illuminating laser beam reflected from said munitions and providing the relative location of said munitions within the shield zone.

12. The system as defined in claim 10 wherein said segmented mirror is operatively coupled between the laser source and the amplifier.

13. The system as defined in claim 10 further comprising a beam director coupled to an output of the amplifier.

14. The system as defined in claim 10 wherein size and location of said shield zone is controllably selected to contain a limited number of said munitions at a given time.

15. A high energy laser weapon system operable for engaging a large number of incoming munitions, said system comprising:

means for detecting the presence of a plurality of incoming munitions;

means for selecting a shield zone that covers only a portion of a potential coverage zone of the system, said shield zone being divided into a plurality of regions;

an illuminating laser for transmitting an illuminating laser beam throughout the shield zone;

a sensor having a focal plane array of sensing elements operable for receiving reflections of said illuminating laser beam reflected from munitions within said shield zone and providing a relative location of the munitions sensed within said shield zone;

a high energy laser generator including a laser energy source and a beam director, said laser energy generator producing a plurality of individually controlled laser beams; and means for independently controlling each of said plurality of laser beams so that said laser beams engage and attempt to destroy the incoming munitions within said shield zone, wherein individual ones of said plurality of laser beams are controlled within different ones of said regions of the shield zone.

16. The system as defined in claim 15 wherein said laser source means comprises:

a laser source for generating laser energy; and a segmented mirror optically coupled to the laser source, said segmented mirror having an array of mirror segments for dividing said laser energy into a plurality of laser beams, each segment being independently controlled so as to control a corresponding laser beam.

17. The system as defined in claim 15 wherein said system further comprises:

a second illuminator laser for transmitting a second illuminating laser beam throughout a second shield zone;

a second sensor for detecting reflected signals reflected off of munitions within said second shield zone;

a second high energy laser generator for generating a plurality of individually controlled laser beams; and means for independently controlling the second plurality of laser beams so that the second plurality of laser beams may engage and destroy munitions within said second shield zone.

18. The system as defined in claim 15 wherein said system is substantially operable from a mobile vehicle.

19. A method of detecting and simultaneously engaging a plurality of munitions with laser energy, said method comprising the steps of:

detecting a presence of a plurality of munitions;

selecting a shield zone that covers only a portion of a potential coverage zone and positioning said shield zone so as to cover a limited number of said plurality of munitions;

detecting a relative location of individual ones of said munitions within said selected shield zone;

producing a plurality of individually controlled laser beams and deploying said laser beams from substantially a common location;

comparing the location of detected munitions within said shield zone with a location of each of said plurality of laser beams; and controlling each of said laser beams so as to simultaneously engage different munitions within said shield zone.

20. The method as defined in claim 19 wherein the step of producing a plurality of laser beams comprises the steps of:

producing laser energy;

directing said laser energy off of a segmented mirror having an array of individually controlled mirror segments to produce individually controlled laser beams; and amplifying said plurality of laser beams.

21. The method as defined in claim 19 wherein the step of detecting a relative location of each of said munitions comprises the steps of:

actively transmitting an illuminating laser beam throughout the selected shield zone; and receiving reflected energy reflected off of said individual munitions present within said shield zone.

22. The method as defined in claim 19 further comprising the steps of:

selecting said selected shield zone to include a first group of said plurality of munitions; and moving the location of said selected shield zone subsequent to engaging munitions of said first group so as to include a second group of said plurality of munitions.

23. The method as defined in claim 19 further comprising the step of adaptively changing the size of said shield zone so that said shield zone includes only a limited number of said plurality of munitions.

24. A method of detecting and engaging a plurality of incoming munitions with laser energy, said method comprising the steps of:

determining a presence of a plurality of munitions;

selecting a shield zone so as to include at least some of said plurality of munitions, said shield zone covering only a portion of a potential coverage zone of the system, and said shield zone being divided into a plurality of regions;

transmitting an illuminating laser beam throughout said shield zone;

receiving reflected energy reflected off of said munitions within said shield zone;

determining a relative location of individual ones of said plurality of munitions within said shield zone;

providing a plurality of individually controlled laser beams;

comparing the location of said detected munitions within said shield zone with a location of each of said plurality of laser beams; and independently steering each of said plurality of laser beams so that said laser beams engage different munitions within said shield zone, wherein individual ones of said plurality of laser beams are steered within different ones of the regions of said shield zone.

25. The method as defined in claim 24 wherein the step of selecting a shield zone includes adaptively configuring size and location of said shield zone so as to include a limited number of said plurality of munitions.

26. The method as defined in claim 24 wherein the step of providing a plurality of laser beams comprises the steps of:

providing laser energy; and directing said laser energy toward a segmented mirror having an array of individually controllable mirror segments so as to produce said plurality of laser beams.

27. The method as defined in claim 26 further comprising the step of amplifying each of said plurality of laser beams subsequent to the step of dividing said laser energy.

28. A laser weapon system operable for detecting and engaging a plurality of munitions, said laser weapon system comprising:

a detector for detecting a presence of a plurality of munitions;

a shield zone selected so as to cover a group of said plurality of munitions, said shield zone covering only a portion of a potential coverage zone of the system;

an illuminating source for generating an illuminating beam and scanning said illuminating beam throughout said selected shield zone;

a sensor for sensing reflections of said illuminating beam reflected from munitions within said selected shield zone and providing a relative location of said munitions sensed within said shield zone;

a laser source for generating laser energy;

a segmented mirror optically coupled to said laser source and having an array of mirror segments for dividing said laser energy into a plurality of laser beams, each of said array of mirror segments being independently controlled so as to control a corresponding laser beam; and a beam controller for independently controlling each of said mirror segments so as to control each of said plurality of laser beams, so that individual ones of said laser beams engages and attempts to damage or destroy individual ones of said munitions sensed within said shield zone.

* * * * *